US012801273B2

(12) United States Patent
Ritchie et al.

(10) Patent No.: US 12,801,273 B2
(45) Date of Patent: Nov. 17, 2026

(54) CONFIGURATION SOURCED DIRECT FROM ETHERNET ADVANCED PHYSICAL LAYER FIELD DEVICE

(71) Applicant: Schneider Electric Systems USA, Inc., Foxboro, MA (US)

(72) Inventors: Briane Ritchie, Foxboro, MA (US); Matthew Michel, Foxboro, MA (US); Larry Brown, Foxboro, MA (US); Mark Bertolina, Forxboro, MA (US)

(73) Assignee: Schneider Electric Systems USA, Inc., Foxboro, MA (US)

( * ) Notice: Subject to any disclaimer, the term of this patent is extended or adjusted under 35 U.S.C. 154(b) by 239 days.

(21) Appl. No.: 18/376,881

(22) Filed: Oct. 5, 2023

(65) Prior Publication Data

US 2024/0118798 A1 Apr. 11, 2024

Related U.S. Application Data

(60) Provisional application No. 63/415,146, filed on Oct. 11, 2022, provisional application No. 63/414,660, filed on Oct. 10, 2022.

(51) Int. Cl.
*G06F 3/04847* (2022.01)
*H04L 67/12* (2022.01)

(52) U.S. Cl.
CPC .......... *G06F 3/04847* (2013.01); *H04L 67/12* (2013.01)

(58) Field of Classification Search
CPC ..... G06F 3/04847; H04L 67/12; H04L 41/12; H04L 41/0806; H04L 67/02; H04L 67/55;
(Continued)

(56) References Cited

U.S. PATENT DOCUMENTS 11,256,238 B1 2/2022 Nixon et al.
2007/0057783 A1 * 3/2007 Reller .................. G05B 19/042 340/538

(Continued)

FOREIGN PATENT DOCUMENTS

WO 2022182727 A1 9/2022

OTHER PUBLICATIONS

Jablonski Frank: "Ethernet APL offers continuous access to process data", Jan. 23, 2022 (Jan. 23, 2022), pp. 3-7, XP093133720, Retrieved from the Internet: URL:https://iebmedia.com/technology/industrial-ethernet/ethernet-apl-offers-continuous-access-to-process-data/ [retrieved on Feb. 21, 2024] * the whole document *.

(Continued)

*Primary Examiner* — Tonia L Dollinger
*Assistant Examiner* — Mehulkumar J Shah
(74) *Attorney, Agent, or Firm* — Quinn IP Law

(57) ABSTRACT

A method is provided of configuring a field device for monitoring and/or controlling an operation(s) of a process or plant. The method includes conducting web-based communication between a networked computer device and the field device over an Ethernet-APL to allow the networked computer device to access and interact with a web page(s) or program(s) that is hosted on a web server running on the field device. The method also includes configuring at the field device an operation parameter(s) and/or setting(s) of the field device based on user input received across the Ethernet-APL by the field device from user interaction with the web page(s) or program(s) through the networked computer device.

24 Claims, 10 Drawing Sheets

(58) Field of Classification Search
CPC ... H04L 67/61; H04L 41/0253; H04L 67/025; G05B 2219/25428; G05B 19/4185; G05B 2219/31104; G05B 2219/31131; G05B 2219/34038; G05B 19/418
See application file for complete search history.

(56) References Cited

U.S. PATENT DOCUMENTS

| | | | | |
|---|---|---|---|---|
| 2007/0142936 | A1* | 6/2007 | Denison | G05B 19/4185 700/29 |
| 2011/0153786 | A1 | 6/2011 | Merkel et al. | |
| 2014/0107810 | A1* | 4/2014 | Johnson | G05B 19/0421 700/19 |
| 2014/0122855 | A1* | 5/2014 | Maneval | G05B 19/0426 713/1 |
| 2015/0186119 | A1* | 7/2015 | Chouinard | G06F 8/33 717/113 |
| 2018/0088548 | A1* | 3/2018 | Sangi | F01K 13/02 |
| 2020/0310394 | A1* | 10/2020 | Wouhaybi | H04L 67/1051 |
| 2020/0348633 | A1* | 11/2020 | Thorpe | G05B 15/02 |
| 2021/0382452 | A1* | 12/2021 | Krishnan | G05B 19/0426 |
| 2022/0075352 | A1 | 3/2022 | Nixon | |
| 2022/0078267 | A1* | 3/2022 | Nixon | H04L 69/14 |
| 2022/0129782 | A1* | 4/2022 | Nixon | G06F 13/38 |
| 2022/0263717 | A1* | 8/2022 | Garcia | H04L 41/022 |
| 2024/0019854 | A1* | 1/2024 | Capoccia | G05B 15/02 |
| 2024/0056320 | A1* | 2/2024 | Swarr | H04L 12/10 |

OTHER PUBLICATIONS

European Search Report and Search Opinion dated Mar. 4, 2024 for corresponding European Application No. EP 23 20 2492.7, 8 pages.

* cited by examiner

CONFIGURATION SOURCED DIRECT FROM ETHERNET ADVANCED PHYSICAL LAYER FIELD DEVICE

The present application claims priority to U.S. Provisional Patent Application Ser. No. 63/415,146, filed Oct. 11, 2022, which is entitled CONFIGURATION SOURCED DIRECT FROM ETHERNET ADVANCED PHYSICAL LAYER FIELD DEVICE, and to U.S. Provisional Patent Application Ser. No. 63/414,660, filed Oct. 10, 2022, which is entitled EDGE FRAMEWORK ON CONSTRAINED DEVICE. The disclosure of the above-identified prior U.S. Patent Applications, in their entirety, is considered as being part of the present application, and thus, is incorporated herein by reference in their entirety.

FIELD

This disclosure relates generally to network device discovery, and more particularly, to systems and methods relating to device configurations sourced direct from Ethernet Advanced Physical Layer (Ethernet-APL) Field Device.

BACKGROUND

As is known, an industrial operation or plant typically includes a plurality of industrial equipment. The industrial equipment can come in a variety of forms and may be associated with various processes, for example, depending on the industrial operation. For example, an industrial operation may include one or more Field Devices (e.g., RTUs, PLCs, actuators, sensors, HMIs) that are used perform, analyze and/or control process variable measurements. These process variable measurements may include pressure, flow, level, and temperature, for example. The industrial operation or plant, and its associated equipment and process(es), may be operated and controlled using a Distributed Control System (DCS) in some instances.

SUMMARY

In accordance with an embodiment, a method is provided of configuring a field device for monitoring and/or controlling an operation(s) of a process or plant. The method includes: conducting web-based communication between a networked computer device and the field device over an Ethernet-APL to allow the networked computer device to access and interact with a web page(s) or program(s) that is hosted on a web server running on the field device; and configuring at the field device an operation parameter(s) and/or setting(s) of the field device based on user input received across the Ethernet-APL by the field device from user interaction with the web page(s) or program(s) through the networked computer device.

In various embodiments, the field device can be an edge controller located in an intrinsically safe or IS region of an industrial process or plant, and web-based communication between the field device and the networked computer device can be conducted over a direct network connection across the Ethernet-APL.

In various embodiments, the web page(s) or program(s) is accessible for user interaction through a web browser running on the networked computer device. The method can further include: sending from the web server the web page(s), a web user interface for the web program(s), or data for generating the web page(s) or the web user interface on the web browser; and receiving at the web server the user input, provided by a user through the web page(s) or the web user interface on the web browser, for configuring the operation parameter(s) and/or setting(s) of the field device. Furthermore, in some embodiments, the web page(s) or the web user interface can provide for user selection of the operation parameter(s) and/or setting(s) for configuration through the web browser. In some embodiments, the web pages(s) or the web user interface can provide web-based information associated with the field device on the web browser of the networked computer device. The web-based information can include: a current configuration of the operation parameter(s) and/or setting(s) of the field device; a current operational status or state of the field device or of a program implemented by the field device for monitoring and/or controlling the process or plant; device information including a device identifier, type, health, and/or communication port information; diagnostic information for the field device; and/or diagnostic information of a process variable or equipment of the process or plant, which is monitored by the field device.

In various embodiments, the web server can be configured to set or update the operation parameter(s) and/or setting(s) for at least one software/firmware program for monitoring and/or controlling the process or plant. The at least one software/firmware program can be configured to run on the field device according to the at least one operation parameter(s) and/or setting(s). Furthermore, the at least one software/firmware program can include at least a control and/or monitoring program for the process or plant, which is tunable according to the operation parameter(s) and/or setting(s). In some embodiments, the control and/or monitoring program can be compliant with IEC 61499, and can include at least a PID (Proportional Integral Derivative) control program or PID control block for controlling the operation(s) of the process or plant.

In various embodiments, the web server can configure the field device by inputting or updating the operation parameter(s) and/or setting(s) maintained in a database(s) based on the user input. The database(s) is stored in a memory on the field device.

In various embodiments, the field device can include an embedded framework platform through which to control operations of the field device including the operations of the web server and a control program to monitor and/or control an operation(s) of the process or plant.

In accordance with an embodiment, a field device is provided for monitoring and/or controlling an operation(s) of a process or plant. The field device includes: a network communication interface for conducting at least web-based communication with a networked computer device over an Ethernet-APL; a memory; and a processor(s). The processor(s) is configured to: host a web page(s) or program(s) on a web server running on the field device, the web page(s) or program(s) being accessible to the networked computer device, over the Ethernet-APL; and configure an operation parameter(s) and/or setting(s) of the field device based on user input received across the Ethernet-APL by the field device from user interaction with the web page(s) or program(s) through the networked computer device. In some embodiments, the field device can be an edge controller located in an intrinsically safe or IS region of an industrial process or plant, and web-based communication with the networked computer device can be conducted over a direct network connection across the Ethernet-APL.

In various embodiments, the web page(s) or program(s) is accessible for user interaction through a web browser running on the networked computer device. Furthermore the processor(s) can be further configured to: send from the web server the web page(s), a web user interface for the web program(s), or data for generating the web page(s) or the web user interface on the web browser; and receive at the web server the user input, provided by a user through the web page(s) or the web user interface on the web browser, for configuring the operation parameter(s) and/or setting(s) of the field device. In some embodiments, the web page(s) or the web user interface can provide for user selection of the operation parameter(s) and/or setting(s) for configuration through the web browser. In some embodiments, the web pages(s) or the web user interface can provide web-based information associated with the field device on the web browser of the networked computer device. The web-based information can include: a current configuration of the operation parameter(s) and/or setting(s) of the field device; a current operational status or state of the field device or of a program implemented by the field device for monitoring and/or controlling the process or plant; device information including a device identifier, type, health, and/or communication port information; diagnostic information for the field device; and/or diagnostic information of a process variable or equipment of the process or plant, which is monitored by the field device.

In various embodiments, the web server can be configured to set or update the operation parameter(s) and/or setting(s) for at least one software/firmware program for monitoring and/or controlling the process or plant. The at least one software/firmware program can be configured to run on the field device according to the at least one operation parameter(s) and/or setting(s). Furthermore, the at least one software/firmware program can include at least a control and/or monitoring program for the process or plant, which is tunable according to the operation parameter(s) and/or setting(s). The control and/or monitoring program also can be compliant with IEC 61499, and can include at least a PID control program or PID control block for controlling the operation(s) of the process or plant.

In various embodiments, the web server can configure the field device by inputting or updating the operation parameter(s) and/or setting(s) maintained in a database(s) based on the user input, the database(s) being stored in the memory.

In various embodiments, the processor(s) can be further configured to: apply an embedded firmware framework to provide an embedded framework platform through which to control operations of the field device including the operations of the web server and a control program to monitor and/or control an operation(s) of the process or plant.

In various embodiments, a system is provided for configuring a field device for monitoring and/or controlling an operation(s) of a process or plant. The system includes a networked computer device; a field device as described above; and an APL switch for enabling communication over an Ethernet network between the network computer device and the field device across Ethernet-APL.

In accordance with an embodiment, a tangible computer medium is provided which stores computer executable code, which when executed by a processor(s), is configured to implement a method of configuring a field device for monitoring and/or controlling an operation(s) of a process or plant. The method includes: hosting a web page(s) or program(s) on a web server running on the field device, the web page(s) or program(s) being accessible to the networked computer device, across Ethernet-APL; and configuring an operation parameter(s) and/or setting(s) of the field device based on user input received across the Ethernet-APL, via a network interface, from user interaction with the web page(s) or program(s) through the networked computer device.

In accordance with an embodiment, systems and methods are provided for direct configuration of a Field Device sourced from an instrument with full Human Machine Interface (HMI) capability are provided herein.

In accordance with an embodiment, a method is provided for configuring Intrinsically Safe, Advanced Physical Layer (APL) based Low Power Field Devices. The method comprises: establishing communications between the Intrinsically Safe, APL-based Low Power Field Devices and a computing device over an Industrial Network; viewing parameters and settings associated with the Intrinsically Safe, APL-based Low Power Field Devices that are capable of and/or in need of configuration via a web-based configuration interface accessed by the computing device; selecting parameters and settings for configuration on the web interface; and configuring the select parameters and settings on the Intrinsically Safe, APL-based Low Power Field Devices.

It is understood that there are many features, advantages and aspects associated with the disclosed invention, as will be appreciated from the discussions below and drawings.

BRIEF DESCRIPTION OF THE DRAWINGS

The foregoing features of the disclosure, as well as the disclosure itself may be more fully understood from the following detailed description of the drawings, in which.

DETAILED DESCRIPTION OF EXAMPLE EMBODIMENTS

Figure 1:
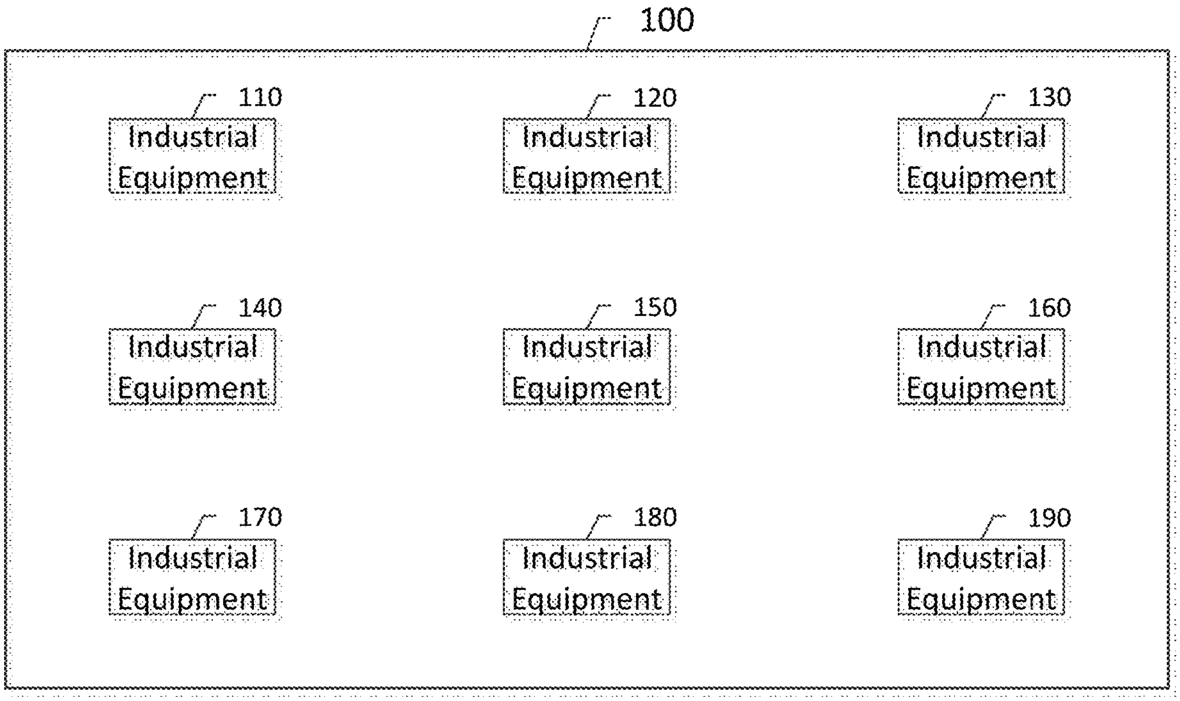
FIG. 1 shows an example industrial operation in accordance with embodiments of the disclosure.

The features and other details of the concepts, systems, and techniques sought to be protected herein will now be more particularly described. It will be understood that any specific embodiments described herein are shown by way of illustration and not as limitations of the disclosure and the concepts described herein. Features of the subject matter described herein can be employed in various embodiments without departing from the scope of the concepts sought to be protected.

For convenience, certain introductory concepts and terms used in the specification are collected here.

As used herein, the term "Edge" is used to refer to Layer 0 of the Purdue Network Model for Industrial Control Systems.

As used herein, the term "Field Device" (also referred to as "field device") is used to refer to Intelligent field instruments with embedded Control/Compute/measurement capability implemented on lower power embedded Microcontroller based platforms.

As used herein, the term "Machine Learning (ML)" is used to refer to the use and development of software that is able to learn and adapt without following explicit instructions, by using algorithms and statistical models to analyze and draw inferences from patterns in data.

As used herein, the term "Embedded Device" is used to refer to a combination of a microcontroller, memory, and input/output peripherals—that has a dedicated function within a larger system.

As used herein, the term "Networked" is used to refer to connected via Ethernet.

As used herein, the term "High availability" is used to refer to a device or application that can operate at a high level, continuously, without intervention, for a given time period. High-availability infrastructure is configured to deliver quality performance and handle different loads and failures with minimal or zero downtime.

As used herein, the term "Intrinsically Safe (IS)" is used to refer to an approach to the design of equipment going into hazardous areas that reduces the available energy to a level where it is too low to cause ignition as certified by per IEC TS 60079-39 or ATEX In accordance with embodiments, disclosed herein are systems and methods relating to device configurations sourced direct from Ethernet Advanced Physical Layer (Ethernet-APL) Field Device(s). More particularly, provided herein are techniques relating to direct configuration of a Field Device (also, sometimes referred to as a Field Instrument or simply Instrument) sourced from an Instrument with full HMI capability. In one example implementation, configuration may occur over a simple browser connection. For example, a direct network connection may be served from the device for configuration, diagnostics, and resource management. This allows for direct communication of active diagnostics over standard network protocols.

Existing technology does not provide comparable bandwidth configuration capability. Only instruments supporting wireless communication links support a similar capability, but at a higher power cost and not in an intrinsically safe environment today. APL solves both power and reliable bandwidth limitations for an intrinsically safe Edge device.

The disclosed systems and methods take advantage of APL technology support of low power devices and Ethernet capability. Additionally, the disclosed systems and methods provides a direct method for accessing entity relational data models without any pre-knowledge of data schema. APL is able to operate safely within the intrinsically safe environment at distances not achievable with traditional Ethernet protocols. Additionally, entity relationships are served over the network from the Edge device, eliminating the need for any existing models or knowledge on the client side.

Example elements believed to be novel and provided by the disclosed invention include:

| | |
|---|---|
| Web Based Configuration for Field Devices | Web configuration and database access via a standard browser for configuring and accessing diagnostics of and Edge device networked over Ethernet API |

The disclosed systems and methods provide for direct configuration of a field instrument sourced from the instrument with full HMI capability.

The invention allows for configuration over simple browser connection, and a direct network connection served from the device for configuration, diagnostics, and resource management. This provides for direct communication of active diagnostics over standard network protocols.

It is understood that the disclosed systems and methods may be found suitable for use in numerous applications. The applications may include, for example, Oil and Gas, Energy, Food and Beverage, Water and Wastewater, Chemical, Petrochemical, Pharmaceutical, Metal, and Mining and Mineral applications.

The various systems and method described herein can provide technical benefits and advantages, including but not limited to the following:

- APL technology support of low power (i.e., power constrained) devices and Ethernet capability.
- Provides a direct method for accessing entity relational data models without any pre-knowledge of data schema.
- APL is able to operate safely within the intrinsically safe environment at distances not achievable with traditional Ethernet protocols.
- Entity relationships are served over the network from the Edge device, eliminating the need for any existing models or knowledge on the client side.

Existing Device Descriptor (DD) technology does not appear to provide comparable bandwidth configuration capability. Only instruments supporting wireless communication links support a similar capability, but at a higher power cost and not in an Intrinsically Safe environment today. APL solves both power and reliable bandwidth limitations for an Intrinsically Safe Edge device.

These and other examples of the systems and methods will be described below with reference to the figures.

Referring to FIG. 1, an example industrial operation 100 in accordance with embodiments of the disclosure includes a plurality of industrial equipment 110, 120, 130, 140, 150, 160, 170, 180, 190. The industrial equipment (or devices) 110, 120, 130, 140, 150, 160, 170, 180, 190 may be associated with a particular application (e.g., an industrial application), applications, and/or process(es). The industrial equipment 110, 120, 130, 140, 150, 160, 170, 180, 190 may include electrical or electronic equipment, for example, such as machinery associated with the industrial operation 100 (e.g., a manufacturing or natural resource extraction operation). The industrial equipment 110, 120, 130, 140, 150, 160, 170, 180, 190 may also include the controls and/or ancillary equipment associated with the industrial operation 100, for example, Field Devices (e.g., RTUs, PLCs, actuators, sensors, HMIs) that are used perform, analyze and/or control process variable measurements. In embodiments, the industrial equipment 110, 120, 130, 140, 150, 160, 170, 180, 190 may be installed or located in one or more facilities (i.e., buildings) or other physical locations (i.e., sites) associated with the industrial operation 100. The facilities may correspond, for example, to industrial buildings or plants. Additionally, the physical locations may correspond, for example, to geographical areas or locations.

The industrial equipment 110, 120, 130, 140, 150, 160, 170, 180, 190 may each be configured to perform one or more tasks in some embodiments. For example, at least one of the industrial equipment 110, 120, 130, 140, 150, 160, 170, 180, 190 may be configured to produce or process one or more products, or a portion of a product, associated with the industrial operation 100. Additionally, at least one of the industrial equipment 110, 120, 130, 140, 150, 160, 170, 180, 190 may be configured to sense or monitor one or more parameters (e.g., industrial parameters) associated with the industrial operation 100. For example, industrial equipment 110 may include or be coupled to a temperature sensor configured to sense temperature(s) associated with the industrial equipment 110, for example, ambient temperature proximate to the industrial equipment 110, temperature of a process associated with the industrial equipment 110, temperature of a product produced by the industrial equipment 110, etc. The industrial equipment 110 may additionally or alternatively include one or more pressure sensors, flow sensors, level sensors, vibration sensors and/or any number of other sensors, for example, associated the application(s) or process(es) associated with the industrial equipment 110. The application(s) or process(es) may involve water, air, gas, electricity, steam, oil, etc. in one example embodiment.

The industrial equipment 110, 120, 130, 140, 150, 160, 170, 180, 190 may take various forms and may each have an associated complexity (or set of functional capabilities and/or features). For example, industrial equipment 110 may correspond to a “basic” industrial equipment, industrial equipment 120 may correspond to an “intermediate” industrial equipment, and industrial equipment 130 may correspond to an “advanced” industrial equipment. In such embodiments, intermediate industrial equipment 120 may have more functionality (e.g., measurement features and/or capabilities) than basic industrial equipment 110, and advanced industrial equipment 130 may have more functionality and/or features than intermediate industrial equipment 120. For example, in embodiments industrial equipment 110 (e.g., industrial equipment with basic capabilities and/or features) may be capable of monitoring one or more first characteristics of an industrial process, and industrial equipment 130 (e.g., industrial equipment with advanced capabilities) may be capable of monitoring one or more second characteristics of the industrial process, with the second characteristics including the first characteristics and one or more additional parameters. It is understood that this example is for illustrative purposes only, and likewise in some embodiments the industrial equipment 110, 120, 130, etc. may each have independent functionality.

As discussed in the Background section of this disclosure, the industrial operation 100, and its associated equipment and process(es), may be operated and controlled using a Distributed Control System (DCS) in some instances.

Figure 2:
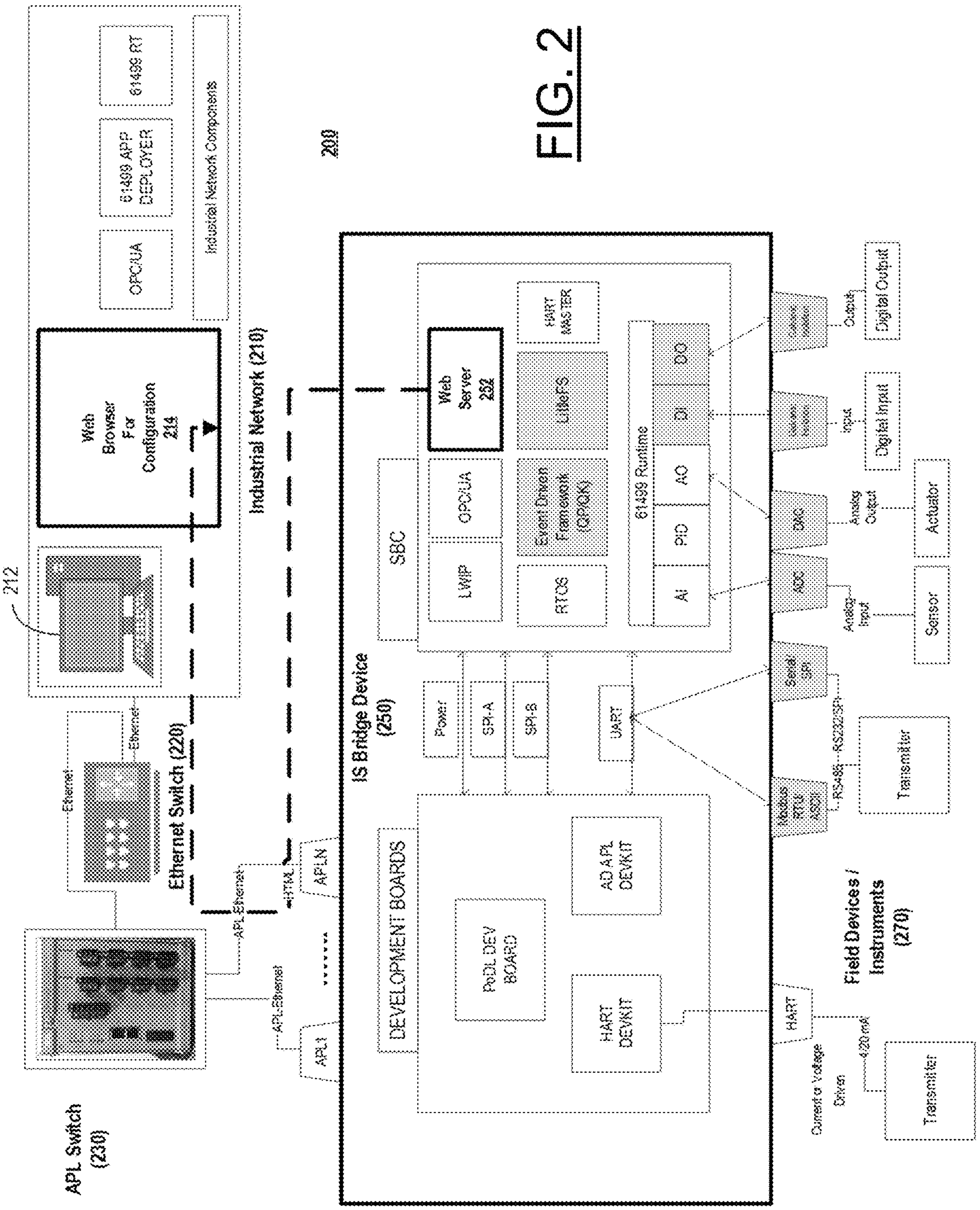
FIG. 2 illustrates an example system which provides for web-based configuration of a field device associated with the disclosed invention in accordance with embodiments of this disclosure.

FIG. 2 illustrates an example web-based configuration of a field device in a networked system 200 in accordance with embodiments of this disclosure. The system 200 can be a monitoring and control system for a process or plant, such as an industrial process or plant, in which equipment to be monitored and controlled may be situated in an intrinsically safe (IS) environment or region due to hazardous conditions. A computer system(s) of in an industrial network, also sometimes referred to as a networked computer device or system, can communicate with equipment such as field devices/instruments in the IS region, across Ethernet-APL which is a physical layer that can support EtherNet/IP, HART-IP, OPC-UA, PROFINET, or other higher-level protocol(s). Ethernet-APL can be provided across 2-wire cable, which supports the exchange of communication signals with field devices/instruments as well as the distribution of energy to such devices/instruments, in an intrinsically safe manner.

For example, the system 200 can include an industrial network 210 of computer system(s) 212 communicatively connected across a network(s), at least one Ethernet switch 220 (e.g., Ethernet router(s)), at least one APL switch 230, and at least one field device such as a bridge device(s) 250 which is communicatively connected to at least one field device/instrument 270. The field device(s)/instrument(s) 270 can include analog and/or digital devices, which can include sensor(s), actuator(s), positioner(s), transmitter(s) and other field devices/instruments, including conventional field instruments used in industrial processes or plants. The computer system(s) 212 in the network 210 can exchange communication with the field devices/instruments, such as with the bridge device 250 or with the device(s) 270 across the bridge device 250, and over the Ethernet network provided through the Ethernet switch 220 and the APL switch 230. In this example, the computer system(s) 212 and the bridge device 250 can exchange communications over OPC/UA protocol, in a client-server or similar way in which the bridge device 250 can act as a Web Server 252 (or Host) to provide the computer system(s) 212 and its user access to various information and functions, through a web page(s) or web program(s) in response to client requests. Such information and functions can be related to monitoring and control of a plant or process, including diagnostic data including measurement data of monitored process variable(s), report(s), alarm(s), notification(s), and other information, which may relate to the bridge device 250 (and its components) and/or operation of equipment in the IS region which is monitored or controlled by field devices/instruments. In accordance with an embodiment, the computer system 212 can perform web-based configuration of the bridge device 250, such as for example, configuration of an operation parameter(s) and/or setting(s) of the bridge device 250.

The bridge device 250 can be an embedded computing device or have embedded functionality, and can include processor(s), memory, analog/digital communication interface(s), and a power unit/system for distributing a supply of power to electrical components of the device 250. The power unit/system can receive a supply of power from an external source such as via the Ethernet-APL cable or wiring, and/or a re-chargeable battery. In various embodiments, the bridge device 250 can include a microcontroller(s) having a processor(s), memory and analog and/or digital input(s)/output(s) (I/O(s)) peripherals. The microcontroller(s) can also include signal converters (e.g., Analog-to-Digital Converter (ADC), Digital-to-Analog Converter (DAC), etc.), signal generators, or signal conditioners. Furthermore, the bridge device 250 can include communication interfaces including analog and/or digital communication interface(s) for communicating with the device(s) 270 and a network communication interface(s) for communicating with the computer system 212 or other field devices (e.g., other embedded devices/edge devices, etc.) across the APL switch 230. The digital I/O communication interfaces can provide for galvanic isolation. In this example, computer or electronic components, such as APL Bridge Board and STM Development Board, which can be programmed, are used to develop and test virtual environments, such as of the bridge device 250, its components, and its functions and operations (including those described herein). In various embodiments, the bridge device 250 can be an embedded edge device or an edge device with embedded monitoring and/or control functionality (e.g., an edge controller), and/or constrained device.

The bridge device 250 or its components may use signal conversion circuitry for I/O operations depending on the type of field device and connection thereto, e.g., analog connection or digital connection. By way of example, in a control loop scenario using an analog-type sensor(s) and actuator(s), the bridge device or its components (e.g., microcontroller, communication interface, etc.) can include an ADC for converting analog measurement signals received from the sensor(s) over an analog connection to digital signals for processing. The bridge device also can include a DAC (which may include the use of PWM or ON/OFF signals) for supplying or outputting an analog control signal to the actuator(s) over an analog connection. The interface with a transceiver(s) of the bridge device 250 can be implemented through serial or other communication using protocols such as UART (universal asynchronous receiver transmitter), SPI (serial peripheral interface), or other interface circuit (or circuitry).

The bridge device 250 can be an embedded computing device with a firmware framework, e.g., a microcontroller-based firmware framework with or without an operating system (OS). The firmware framework, when applied on the bridge device 250 and hardware components thereof, provides an embedded framework platform (e.g., software/firmware and hardware) through which the device is configured to perform various event-driven tasks and associated functions. The tasks can, for example, include measurement operation(s) (e.g., sampling measurement data, performing measurement calculations, etc.), computation operation(s) including ML operation(s) and/or process control operation(s) (e.g., Proportional Integral Derivative (PID) controller/control loop(s)/control block(s), etc.), analog and/or digital I/O operation(s), control operation(s) and/or other device operations, which can be performed simultaneously and/or asynchronously. For example, in some embodiments, the framework platform can provide for simultaneous, analog measurement, digital I/O, compute (i.e., machine learning), and control on a signal microcontroller-based embedded platform with no operating system. The framework platform also can support network connections and simultaneous Field Bus connections.

In various embodiments, the framework platform can be an event-driven framework, which is configured to provide a priority and preemptive multi-tasking scheme for scheduling and executing event-driven tasks. The event-driven tasks can be configured to run to completion or RTC. The framework platform can provide for such improved scheduling of prioritized tasks (e.g., event-driven tasks) using a combination of Active Object UML state machines and real-time threaded task execution of third-party open source stacks. For example, the framework platform can allow measurement calculations and Machine Learning computations to run in a prioritized scheme while servicing I/O on the same processing unit (e.g., microcontroller). The run to completion or RTC model tasks combined with the preemptive/prioritized multi-tasking can allow for load balancing for performance based on the priorities with no additional developer specification or implementation (e.g., blocking conditions or checks). The framework platform can include built-in instrumentation (or other) tasks, which can run at a lowest priority (or lower priority) to allow the user to measure performance and task tune priorities as well as set I/O latency watermarks.

As shown in the example of FIG. 2, the bridge device 250 can include various functional/software/firmware modules through the framework platform to support or control autonomously various operations of the device as described herein. The modules can include LWIP, OPC/UA, HART MASTER, Web Server 252 and an embedded framework with RTOS (Real Time Operating System) or without an operating system through QP/QK, and other functional or software/firmware modules (e.g., LittleFS support, etc.). The modules also can provide for an IEC 61499 runtime environment, which can execute or run various control programs, functions or blocks. The control programs, functions or blocks can include: input/output operations including analog input (AI), analog output (AO), digital input (DI), and digital output (DO); control operations (e.g., Proportional Integral Derivative (PID) controller/control loop(s)/control block(s) or other process control scheme) and/or other operations or functions (e.g., ML app, etc.). The Digital Inputs (DI), Digital Outputs (DO), Analog Inputs (AI), and Analog Outputs (AO) enable communication and control between the processor(s)/microcontroller(s) and devices in a system or process. In various embodiments, the framework platform can implement a 4diac FORTE, which is a small portable implementation of an IEC 61499 runtime environment, to execute or run control applications (e.g., I/O, calculate, compute, control, etc.) to perform various operations and functions on or through the bridge device 250 including those described herein.

Lightweight TCP/IP (LWIP) is a TCP/IP stack for embedded platforms, which can support a significant number of networking protocols in the TCP/IP suite. LWIP can facilitate easy migration of existing network or socket applications to an embedded platform.

The Open Platform Communications Unified Architecture (OPC UA) framework can support client/server services and protocols, and publish/subscribe (PubSub) models and protocols. OPC UA can run on a dedicated client and server relationship. In the Pub Sub scenario, the server can send (publish) data to the network, and the client (who subscribed) will receive the data. The OPC UA PubSub communication model can provide an optimized Publish Subscribe model for various use cases, including those in which Client/Server Subscription may not be appropriate or available. The OPC UA Stack can implement serialization, security and transport of messages exchanged between different UA Applications.

HART is a bi-directional communication protocol that provides data access between a master host system(s) and a slave field device(s), e.g., a 4-20 mA analog signal (also referred to as "4 to 20 mA") which may also include an embedded digital signal. The 4-20 mA signal can communicate a primary measured value (in the case of a field device) using the 4-20 mA current loop. HART MASTER refers to the functionality on the master-side for the HART protocol.

QP ("Quantum Platform") is a family of open source real-time embedded frameworks (RTEFs) and runtime environments based on active objects (Actors) and hierarchical state machines (e.g., UML (Unified Modeling Language) state machine or statecharts). In general, a state machine (including UML state machines) can assume that a state machine completes processing of each event or tasks associated therewith (e.g., event-driven tasks) before it can start processing the next event, also referred to as run to completion or RTC. The QP RTEFs can include a selection of built-in real-time kernels, such as for example the cooperative QV kernel, the preemptive non-blocking QK kernel, and the unique preemptive, dual-mode (blocking/non-blocking) QXK kernel. The QP RTEFs can run standalone, completely replacing the traditional Real Time Operating System (RTOS). QK (Preemptive Kernel) is a preemptive non-blocking run-to-completion kernel, which is designed for executing state machines in a run-to-completion (RTC) fashion.

Web Server can handle and fulfill various requests (e.g., HTTP requests, etc.) from clients. As described herein, a field device such as the bridge device 250 can host a Web page(s) or Web program(s) (also referred to as Web page(s) or program(s)) on a Web Server 252 running on the device. A client(s) (e.g., the computer system 212) can interact with the Web Server or the Web page(s) or Web program(s) hosted on the Web Server 252, using a Web browser (e.g., 214) at the client. In accordance with various embodiments, a client can access and request through the Web Server 252 and its hosted resources, e.g., the Web page(s) or program(s), Web-based configuration of a field device such as the bridge device 250, request Web-based information related to the device or the monitoring/control of a process or plant, and/or request some other Web-based action to be taken by the device. For example, the web-based configuration can relate to input, update or modification of an operation parameter(s) or operation setting(s) (also referred to as operation parameter(s) or setting(s)) of the field device. The requested information can include data related to the field device (e.g., device information, etc.), a process or plant, and/or a monitoring/control of operation(s) of the process or plant, such as for example measurement data for a process variable (e.g., flow rate, temperature, de-salinization percentage, etc. over time), diagnostic information for the field device, diagnostic information for one or more aspects of the process or plant (e.g., process or plant equipment, etc.), as well as reports, alarms, notifications associated with the operation(s) of the process or plant, or the field device. Accordingly, the bridge device 250 is configured to provide for web-based configuration or web-based access to database information (maintained by the device 250) by the computer system 212 or other networked computer system or device, across the APL switch 230, over the Ethernet-APL.

In operation, the bridge device 250 can perform various functions and operations (including those described herein). For example, the bridge device 250 can host a web page(s) or program(s) on the Web Server 252 running on the device. The web page(s) or program(s) is accessible to the computer system 212, across Ethernet-APL via the APL switch 230. In an example embodiment, a user can access the Web page(s) or program(s) hosted on the Web Server 252 of the bridge device 250 through a Web browser 214 on the computer system 212. For instance, the user can initiate an access request to a desired resource through the Web browser using the address of the resource such as its URL (Uniform Resource Locator), e.g., the URL of the bridge device 250 or its specific resources such as the Web page(s) or program(s) hosted on its Web Server 252. Thereafter, the Web Server 252 can provide access to the Web page(s) or program(s) through the Web browser of the computer system 212. The Web program(s) may be provided through a Web user interface, which is provided through the Web browser. The Web Server 252 may provide information (e.g., information in HTML or other suitable markup language) from which the Web browser can generate and populate the Web page(s) or Web user interface. As described herein, in various embodiments, the resources hosted on the Web Server 252 of a field device, such as the bridge device 250, can include for example Web page(s) or program(s) through which to configure the field device, such as its operation parameter(s) or setting(s), and/or to request and obtain information related to the field device or monitoring and/or control operations of the field device in relation to the process or plant. In various embodiments, examples of Web page(s) or interface(s) for Web-based configuration or Web-based access to information are shown in FIGS. 6-10, which are described in further detail below.

The bridge device 250 also can perform I/O operations, across analog communication interface(s) and/or digital communication interface(s) (which may have galvanic isolation) with the devices 270. The I/O operations can use various communication protocols/connections (e.g., HART, Modbus Remote Terminal Unit (RTU)/ASCII, Serial/SPI, Fieldbus and/or other known communication protocols and connection architecture for use with field devices/instruments/industrial network systems). In this capacity, the bridge device 250 can act as a bridge between the networked computer system 212 or networked control system (e.g., PLC, DCS, etc.) and the device(s) 270, which may be incompatible with Ethernet-APL. For example, one of the field devices/instruments 270 can employ HART protocol, which uses an analog connection (e.g., 4-20 mA) to communicate with other devices, such as for example the bridge device 250. In various embodiments, the bridge device 250 can perform simultaneous I/O operations across analog and/or digital connections using the same or different communication protocols, with one or more field devices/instruments 270 according to the programs running on the framework platform. Various examples of monitoring/control programs are shown and described with reference to the examples of FIGS. 2, 3, 6, and 10.

It should be understood that the bridge device 250 and its components (including the number and types of modules) are provided simply as an example of a field device or edge device (e.g., edge controller). In some embodiments, the bridge device 250 can have incorporated therein (or be incorporated into) a field device/instrument 270, such as a sensor, an actuator, a positioner, a transmitter, or other field device/instrument used in industrial processes or plants.

Figure 3:
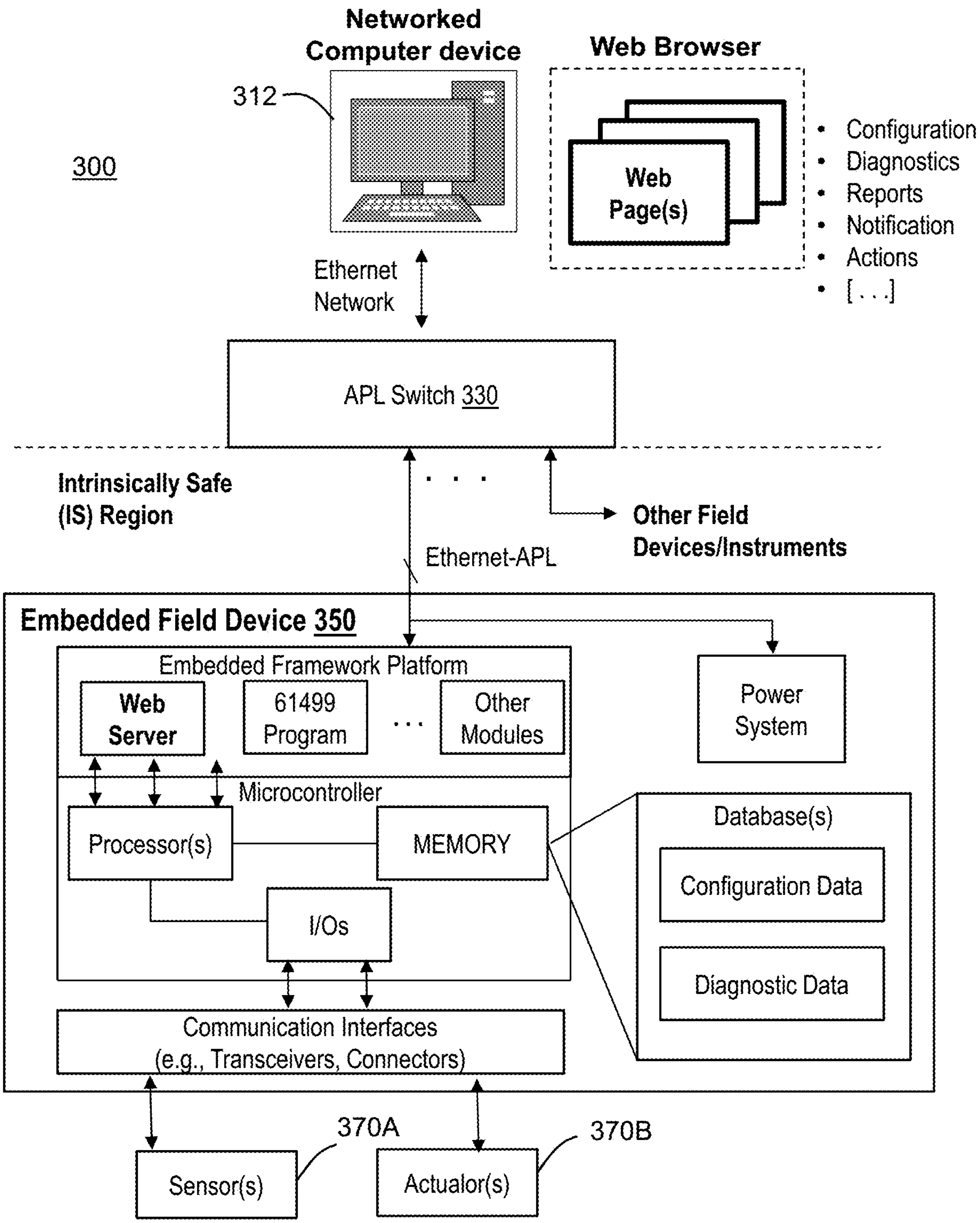
FIG. 3 illustrates a block diagram of example components of a field device in an industrial system in accordance with embodiments of the disclosure.

FIG. 3 illustrates an example system 300, which includes a networked computer device 312 and a field device 350, which are connected across an APL switch 330 and can conduct communications over an Ethernet network across an Advanced Physical Layer, e.g., Ethernet-APL, in accordance with embodiments of the disclosure. The system 300 also can include field devices/instruments 370A and 370B, each of which can be communicatively connected to the field device 250 over an analog connection using analog communication protocol, or over a digital connection using a digital communication protocol. The system 300 can be a monitoring and/or control system for an industrial process or plant.

In the system 300, the field device 350 is located in an IS region near the monitored or controlled equipment of the process or plant, and can be an edge device such as an edge controller. The field devices/instruments 370A and 370B also are located in an IS region near the monitored or controlled equipment. In this example, the field device/instrument 370A is a sensor(s) to monitor/measure process variable(s) (e.g., temperature, flow rate, pressure, etc.), and the field device/instrument 370B is an actuator(s) for controlling an operation of equipment in the process or plant.

In this example, the field device 350 can include a microcontroller(s) having a processor(s) (e.g., CPU(s)), memory and Analog and/or Digital I/O peripherals, as well as other equipment such as communication interfaces (e.g., transceivers, transmitter/receiver, modem and associated connectors) through which to communicate with field devices/instruments or other devices via industrial communication protocols (e.g., HART, FIELDBUS, MODBUS RTU, SERIAL, etc.) and/or with the networked computer device 312 or other networked devices/systems across Ethernet-APL. The memory can store firmware (e.g., program(s)), and database(s) of data or information, including configuration data, diagnostic data, and other data or information described herein which is maintained or used by the field device 350 to implement the various functions and operations described herein. The configuration data can, for example, be used to control a manner in which the field device 350 operates when performing various functions, such as the monitoring and/or control of an operation(s) of a process or plant. The configuration data can include operation parameter(s) and/or operation setting(s) for the device and programs/functions implemented by the field device 350. The diagnostic data can include diagnostic information related to the operation of the field device and/or the operation of the monitored process or plant (including its equipment).

As further shown in FIG. 3, the processor(s) of the device 350 can apply an embedded microcontroller-based firmware framework to provide an embedded framework platform, which can be event-driven. In various embodiments, the framework platform can perform a multi-tasking scheme with prioritized and preemptive scheduling of tasks, which are intended to run to completion or RTC. The framework platform can provide for various functionality, including the execution of a Web Server and associated tasks including the hosting of resources such as Web page(s) and program(s) on the Web Server, the execution of IEC 61499-compliant program(s) and associated tasks for monitoring and/or controlling operation(s) of a process or plant (e.g., PID control, I/O control, etc.) and the execution of other control programs, functions or control blocks. The framework platform also can provide for communications with the same or different devices over different types of communication connections/protocols, providing for a centralized data manager, providing for firmware update (including update of the framework or modules thereof); providing for multi-tasking; and providing for other dedicated operations depending on the application for the field device 350. Accordingly, through the framework, the field device 350, which can be an edge device, can perform various dedicated operation and functions in an autonomous manner. In various embodiments, the field device 350 can be an edge controller in an IS region of an industrial process or plant.

In this example, the field device 350 can communicate with a networked computer device 312, via the APL switch 330 over an Ethernet network across an APL (e.g., Ethernet-APL), and can receive a supply of power from the Ethernet-APL cable or wiring to power the electrical components of the device. In accordance with various embodiments, the networked computer device 312 can access and interact with various resources hosted on the Web Server of the device 350, though a Web browser. The resources can be accessed through Web page(s) or program(s) hosted on the Web Server, and can include Web-based configuration of the field device 350 (and its operations/functions), Web-based access to diagnostic and other data or information available from the field device 350; and other Web-based functions and information available on the field device 350 (including those described herein). For example, a user can access the Web-based resources hosted by the Web Server using the Web browser on the networked computer device 312 to: configure (or re-configure) an operation parameter(s) or setting(s) of the device 350 or programs/functions associated therewith; access or view diagnostic and other information related to the field device 350, the monitoring/control of the process or plant (and its equipment) by the device 350, and/or the process or plant (and its equipment); or to access other Web-based functionality or information related to the field device 350 or its operations.

The field device 350 also can communicate with the field devices/instruments 370A and 370B using the same or different communication protocols, such as industrial protocols which may employ analog or hybrid connection (e.g., HART protocol including 4-20 mA, or other known industrial analog communication protocols) or may employ digital connection (e.g., Fieldbus protocol, Modbus protocol, or other known industrial digital communication protocols). The field device 350 can be an edge device and/or a constrained device.

In various embodiments, the field device 350 can perform the function(s) of monitoring and/or control of an operation(s) of a process or plant according to defined configuration, such as parameter(s) or setting(s) for the function(s). For example, the field device 350 can be configured to receive measurement data from the field device/instrument, such as the sensor(s) 370A, via a first communication interface provided on the device. The measurement data can include measurements of a process variable(s) for a process. The field device 350 can employ the measurement data as process input to control operations of the process or equipment thereof, according to defined parameter(s) and/or setting(s) for the associated function. For example, the field device 350 can employ the measurement data in a control loop(s), e.g., PID control which is compliant with IEC 61499, to generate control signals for a control element in order to maintain process variables (PVs) at a desired value or set point (SP). The field device 350 can transmit the control signals to the control element, in this case, a field device/instrument such as the actuator(s) 370B. Depending on the process/plant application, the actuator(s) 370B can actuate process/plant equipment, such as valve(s), damper(s), fluid coupling(s), and other device(s) used in industrial process/plant control. The measurement data from the sensor(s) 370A can be received by the device 350 through an analog or hybrid connection using a first type of communication protocol, and the control signal can be transmitted by the device 350 across a digital connection using a second communication protocol which can be different than the first type of communication protocol. The field device 350 can implement these I/O operations across the same or different types of connections simultaneously.

In various embodiments, the field device 350 also can be configured to act as a bridge (or a bridge device) to facilitate the exchange of data between the networked computer system(s) and the field devices/instruments 370A and 370B. For example, the networked computer system(s) can request and receive, via the bridge device 350, diagnostic or other information (e.g., measurement data, configuration data, notification data, alarm data, etc.) from the field devices/ instruments 370A and 370B. The diagnostic or other information can be stored in a database(s) in a memory of the field device 350. In some embodiments, the field device 350 also can be configured to publish such information to subscribing clients, including the networked computer system(s), such as through the Web Server. The networked computer system(s) also can update a configuration, including software/firmware update, of the field devices/instruments 370A and 370B through the bridge device 350, which can be configured to facilitate or perform such updates or changes on behalf of or at the request of the networked computer system(s).

In various embodiments, the field device 350 may interact with other field devices/instruments, such as other field devices like the device 350, to coordinate monitoring and control operations for the process or plant, locally in the IS or other region. Accordingly, a plurality of field devices 350 can be employed individually or in combination to monitor and/or control a sub-process or sub-system of the process or plant. For example, instead of implementing both receipt of measurement data and the output of control signals, these operations can be implemented on separate field devices, which can communicate across the APL switch 330 or other connection suitable for use in IS region. In various embodiments, each of the field devices 350 can provide a Web Server and host resources as described herein, or one or more field devices 350 can act as an intermediary to provide the Web resources (as described herein) for other field devices 350.

Figure 4:
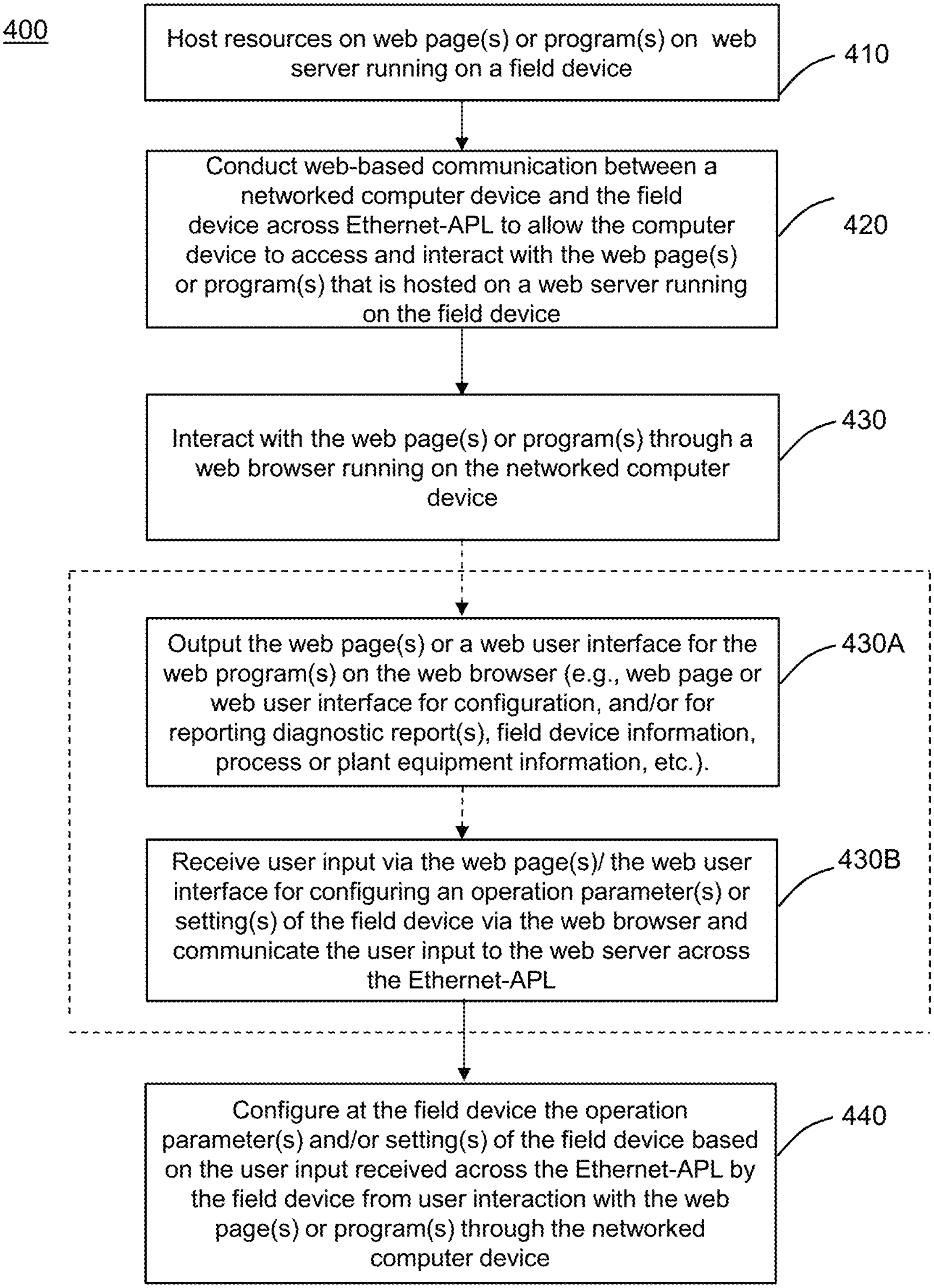
FIG. 4 illustrates a flow diagram of an example process by which to perform web-based configuration of a field device in accordance with embodiments of the disclosure.

FIG. 4 illustrates a flow diagram of an example process by which to implement Web-based resources, including Web-based configuration and Web-based access to diagnostic and other information, hosted on a Web Server of a field device in accordance with embodiments of the disclosure. By way of example explanation, the process 400 will be described with reference to a field device (e.g., 250, 350) and a networked computer device (e.g., 212, 312). The components of the field device can include, for example, a processor(s), memory and I/O peripherals, which may take the form of a microcontroller(s), and a communication interface(s) including a network communication interface. The components of the networked compute device can include, for example, a processor(s), memory, network communication interface, and display device. The field device can be an embedded edge device or edge device with embedded monitoring and/or control functionality (e.g., edge controller) and/or constrained device.

The process begins at block 410, in which the field device can operate as a Web Server, which hosts resources on a Web page(s) or program(s). The resources can include: Web-based configuration of the field device, such as configuration of an operation parameter(s) and/or setting(s) for the field device; Web-based access to diagnostic and other information maintained or accessible to the field device, which is related to the field device, the process or plant, or the monitoring/control by the field device of an operation(s) of the process or plant; and other Web-based functionality related to the field device.

At block 420, communication can be conducted between the networked computer device and the field device over Ethernet-APL (e.g., over an Ethernet network across an APL) to allow the networked computer device to access and interact with a Web page(s) or program(s) that is hosted on the Web Server running on the field device. For example, a user can access the Web page(s) or program(s) with the hosted resources through a Web browser on the networked computer device, e.g., using the URL associated with the Web Server or the hosted resource(s). In one example, in response to the user request through the web browser, the Web Server running on the field device can return data, for the requested resource, which may be used to render a Web page(s) or Web user interface (for the Web program(s)) and populate information on therein.

At block 430, the networked computer device or its user can interact with the Web page(s) or program(s), through the Web browser, to access resources hosted on the Web Server. For example, at block 430A, the Web page(s) or a Web user interface (Web page/interface) for the web program(s) is generated, rendered or output on the Web browser. The Web page(s)/interface(s) can be a Web page or Web user interface for configuring the field device, and/or for outputting or displaying diagnostic report(s), field device information, a state of process or plant equipment information, a notification, an alarm or other information related to the field device, the process or plant (or equipment associated therewith), or the monitoring/control operation by the field device of the process or plant. A menu of options can be provided through which the user can select a desired resource, e.g., configure field device or access and display selected type(s) of information maintained or available through the Web Server running on the field device. The user can, for example, select or access the Web page/interface through which to configure the field device. At block 430B, user input can be provided through the Web page/interface on the Web browser to configure the field device. The user input can relate to an operation parameter(s) and/or setting(s) for the field device and its function (e.g., for process/plant monitoring and/or control function). After inputting the configuration information (or update thereof), the user can submit the user input to the Web Server (e.g., by selecting or clicking a graphical Submit button or element), and the user input is thereafter communicated to the Web Server for further processing.

At block 440, the Web Server receives the user input across the Ethernet-APL from user interaction with the web page(s) or program(s) through the networked computer device, and configures at the field device the operation parameter(s) and/or setting(s) of the field device based on the received user input. For example, the Web Server inputs, sets or updates the configuration information, such as the operation parameter(s) and/or setting(s), which may be maintained in a database(s) stored on the field device, based on the user input. A confirmation of the update of the configuration information on the field device may be returned to the networked computer device for display on the Web browser.

Figure 5:
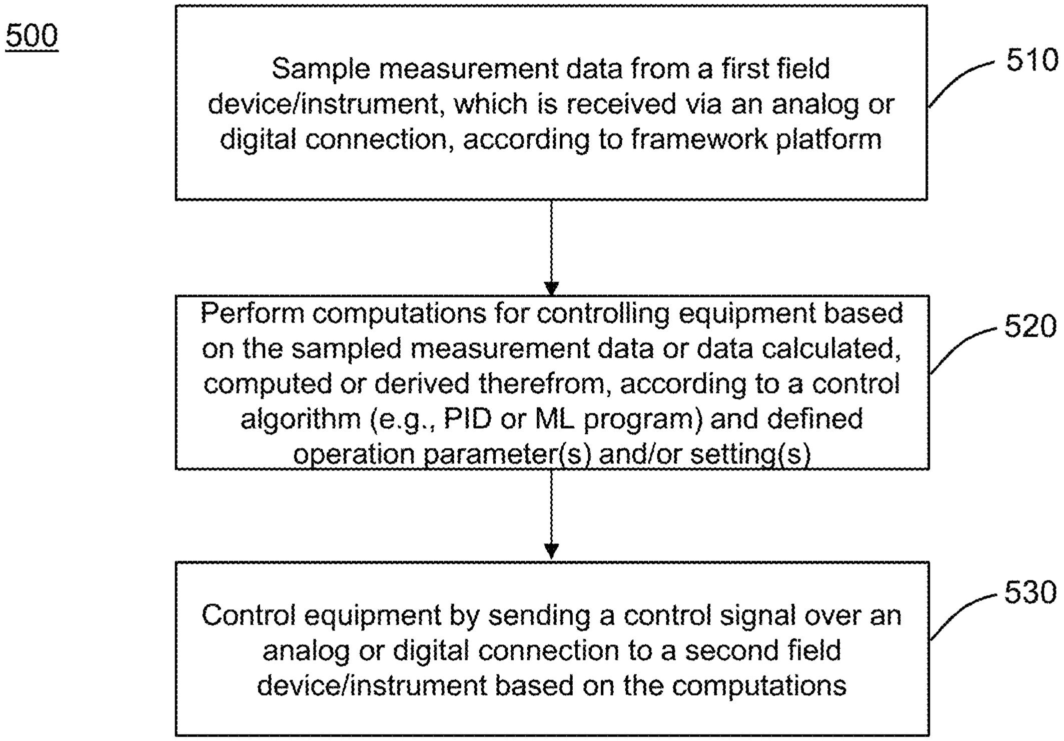
FIG. 5 illustrates a flow diagram of an example process by which operations of a field device, which is an embedded edge controller, is performed to monitor and/or control an operation(s) of a process or plant in accordance with embodiments of the disclosure.

FIG. 5 illustrates a flow diagram of an example process 500 by which operations of a field device is performed to monitor and control an operation(s) of a process or plant in accordance with embodiments of the disclosure. By way of example explanation, the process 500 will be described with reference to a field device (e.g., examples in FIGS. 2-3) and components thereof. The components can include, for example, a processor(s), memory and I/O peripherals, which may take the form of a microcontroller(s). The field device can be an embedded edge device or an edge device with embedded monitoring and/or control functionality (e.g., edge controller) and/or constrained device.

The process 500 begins at block 510 in which the processor(s) samples measurement data from a first field device/instrument, which is received via an analog connection, according to a framework platform.

At block 520, the processor(s) performs computations for controlling equipment based on the sampled measurement data or data calculated, computed or derived from the measurement data, according to a control algorithm (e.g., PID or ML app or program). The control algorithm is implemented according to defined configuration information, which may be set or updated by a user via Web-based configuration such as described herein. The configuration information can include an operation parameter(s) and/or setting(s) for the control algorithm or operations associated therewith.

At block 530, the processor(s) controls process/plant equipment by sending a control signal over an analog or digital connection to a second field device/instrument based on the computations. For example, the processor can generate (or control generation) of a control signal for use in controlling the operation of the second field device/instrument, which in turn controls operational aspects or equipment of the process or plant.

The method 500 is simply provided as an example. As described herein, instead of implementing both receipt of measurement data and the output of control signals, these operations can be implemented on separate field devices/instruments, which can communicate across the APL switch 520 or other connection suitable for use in an intrinsically safe or IS region. Furthermore, various combinations of field devices (with embedded framework platforms) along with other field devices/instruments, may be used to distribute various operations and functions therebetween to monitor and/or control (and provide other functionality) in an IS or other operational/on-site region of an industrial process or plant.

FIGS. 6-10 illustrate various examples of Web-based information, which may be generated and rendered on a Web page or Web user interface displayed through a Web browser on a display device of a networked computer device or system. The Web-based information can include a layout of information received from a Web Server of a field device and/or graphical input elements through which a user can select and configure aspects of the field device or its operations, including an operation parameter(s) and/or setting(s). In various embodiments, the networked computer device or system can be part of an industrial network, and may take the form of a Human Machine Interface (HMI) through which to interact with one or more field devices located in an IS region of the industrial process or plant. The networked computer device can interact with one or more field devices over an Ethernet network, across an APL (e.g., Ethernet-APL) via an APL switch.

Figure 6:
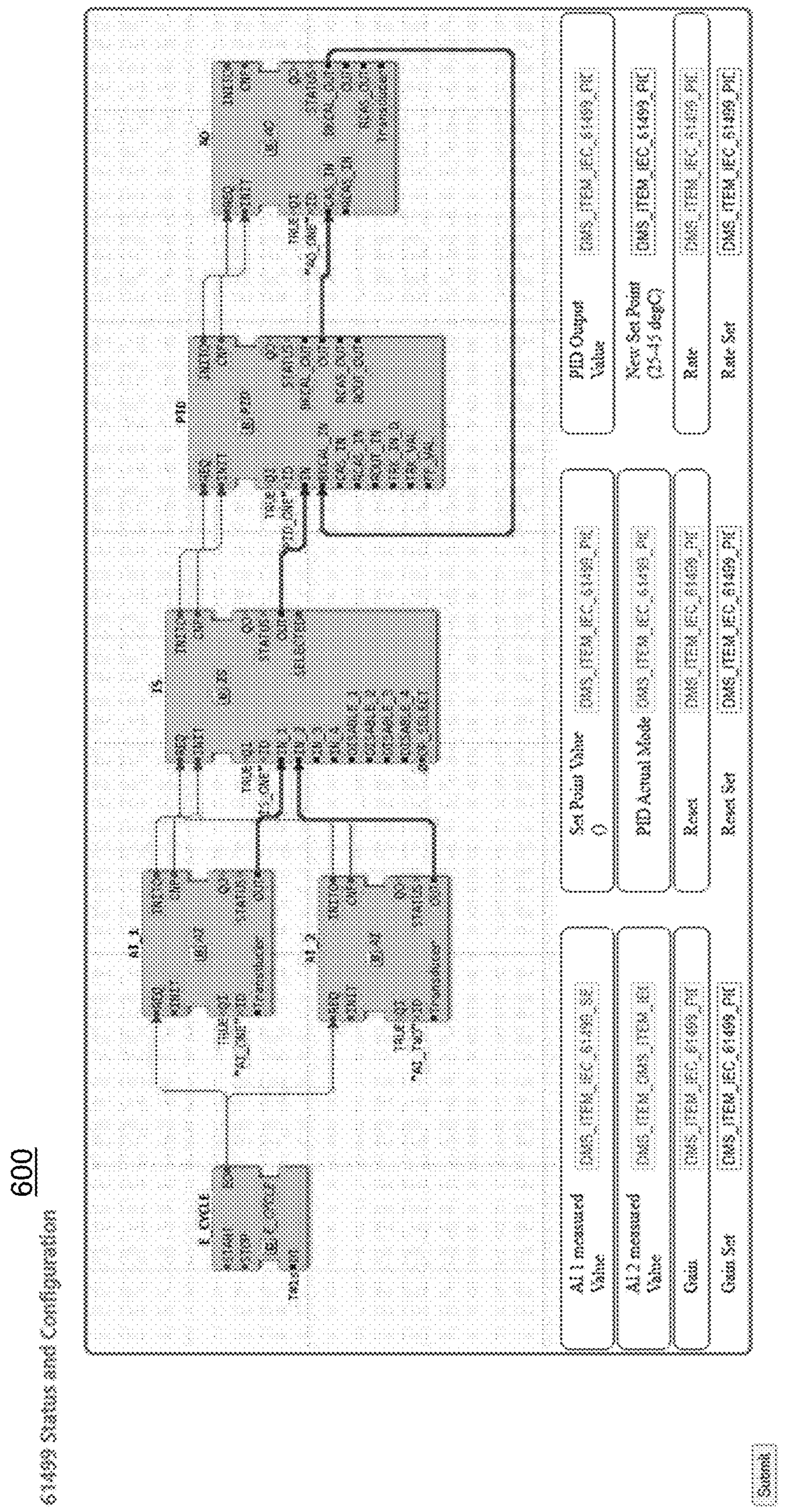
FIG. 6 illustrates an example web-based information of status and configuration of monitoring and/or control operations of a process or plant, which is/is to be performed by the field device, in accordance with embodiments of the disclosure.

FIG. 6 illustrates an example web-based information 600 of status and configuration for a monitoring and/or control operation of a process or plant, which is/is to be performed by the field device, in accordance with embodiments of the disclosure. As shown in FIG. 6, a layout of functional components/blocks of an IEC 61499 model control program is shown (including for example the E Cycle block, AI_1 and AI_2 blocks, IS block, PID control block, and AO block wherein AI is Analog Input, AO is Analog Output). A present Status or Configuration of various operating variables, parameters and settings (including their present value or setting) can also be shown. The variables, parameters and settings can include, for example, AI 1 measured Value, AI 2 measured value, Gain, Gain Set, Set Point Value, PID Actual Mode, Reset, Reset Set, PID Output Value, New Set Point (25-45 deg C.), Rate and Rate Set.

Figure 7:
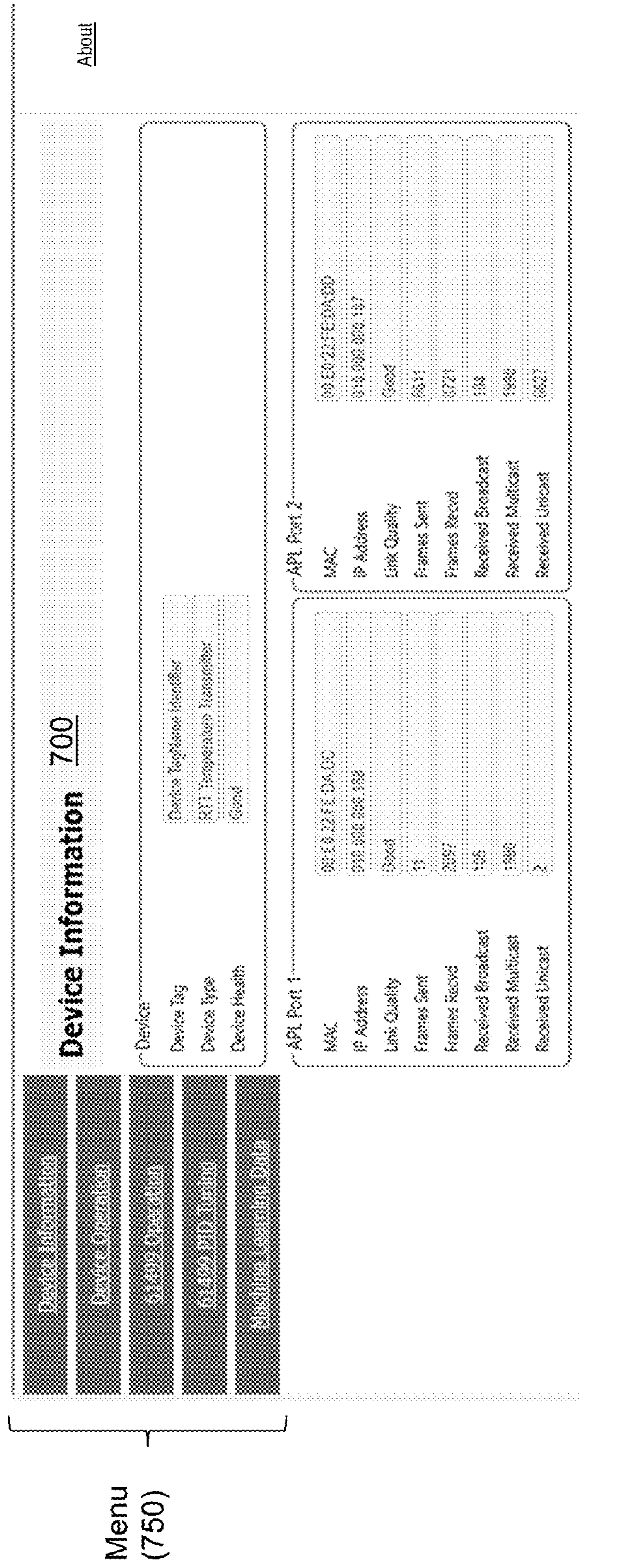
FIG. 7 illustrates an example web-based information of device information for the field device, in accordance with embodiments of the disclosure.

FIG. 7 illustrates an example web-based information of device information for the field device, in accordance with embodiments of the disclosure. The Web-based information includes Device Information 700 and a Menu 750 of selectable resources hosted on a Web Server of a field device.

The Device Information 700 can include various information, including diagnostic information, about the field device. In this example, the Device Information 700 includes Device Tag (e.g., Device TagName Identifier), Device Type (e.g., RTT Temperature Transmitter), and Device Health (e.g., Good). The Device Information 700 also includes APL Port information for APL Port 1 and APL Port 2. For each APL Port, there is shown the current values for the MAC, IP Address, Link Quality, Frames Sent, Frames Received, Received Broadcast, Received Multicast, and Received Unicast.

Figure 10:
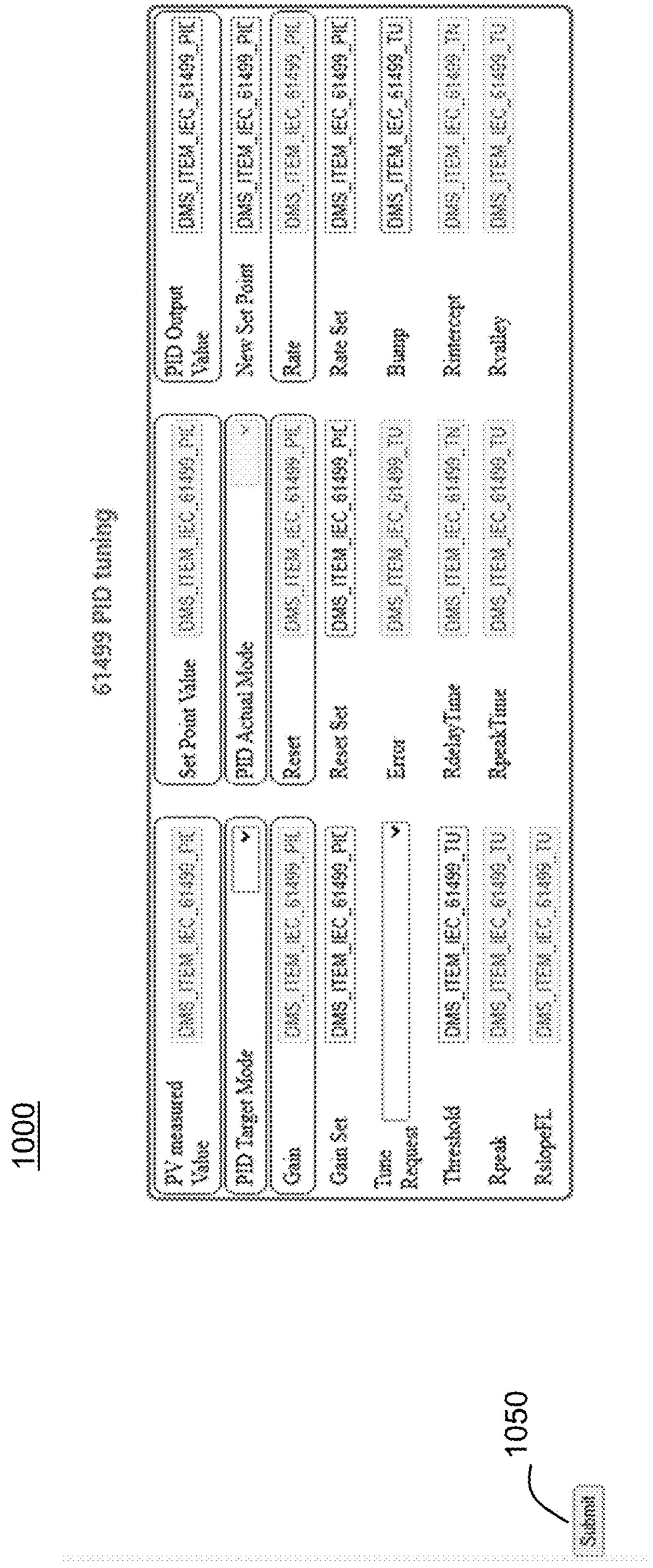
FIG. 10 illustrates an example web user interface or web page through which a user can define or change parameters and settings of a control operation/function to be performed by the field device, in accordance with embodiments of the disclosure.

The Menu 750 can include a selection of available resources (or links thereto), including the Device Information, Device Operation, 61499 Operation, 61499 PID Tuning, and Machine Learning Data, which are selectable by a user through a Web browser. The 61499 PID Tuning menu item is a link to access a Web page or Web user interface through which to configure and tune the PID control of an operation of an industrial process or plant. In this example, the PID control is compliant to IEC 61499. An example of the PID Tuning is shown in FIG. 10, which is described in greater detail below.

Figure 8:
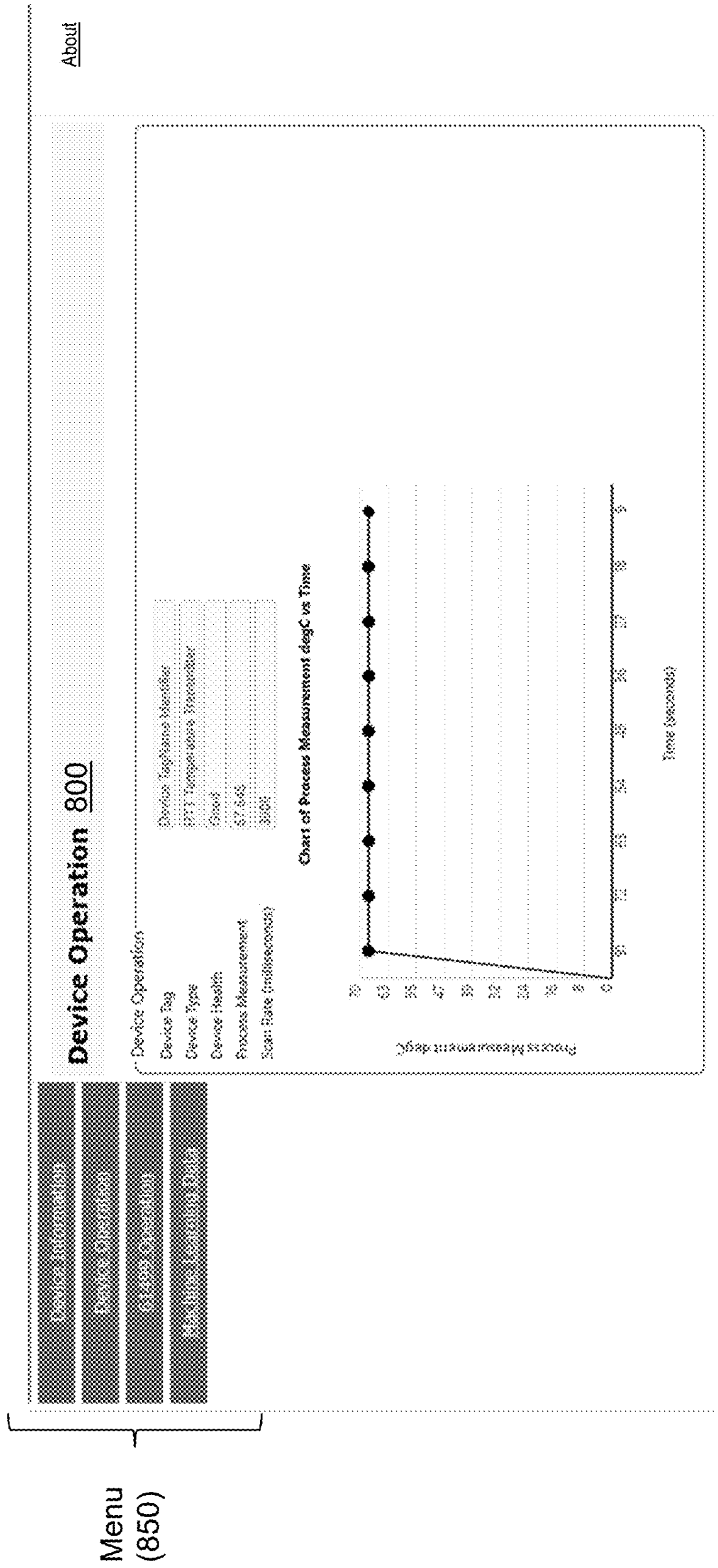
FIG. 8 illustrates an example web-based information of device operation for the field device, in accordance with embodiments of the disclosure.

FIG. 8 illustrates an example web-based information of device operation for the field device, in accordance with embodiments of the disclosure. The Web-based information includes Device Operation 800 and a Menu 850 of selectable resources hosted on a Web Server.

The Device Operation 800 includes various information, including diagnostic information and other, about the field device and its operations. In this example, the Device operation 800 includes Device Tag (e.g., Device TagName Identifier), Device Type (e.g., RTT Temperature Transmitter), and Device Health (e.g., Good); Process Measurement (e.g., 67.645 degrees Celsius), and Scan Rate (e.g., 3000 milliseconds). The Process Measurement (in degrees Celsius) over Time (in seconds) is provided in graph.

The Menu 850 includes a selection of available resources, including the Device Information, Device Operation, 61499 Operation, and Machine Learning Data, which are selectable by a user through a Web browser.

Figure 9:
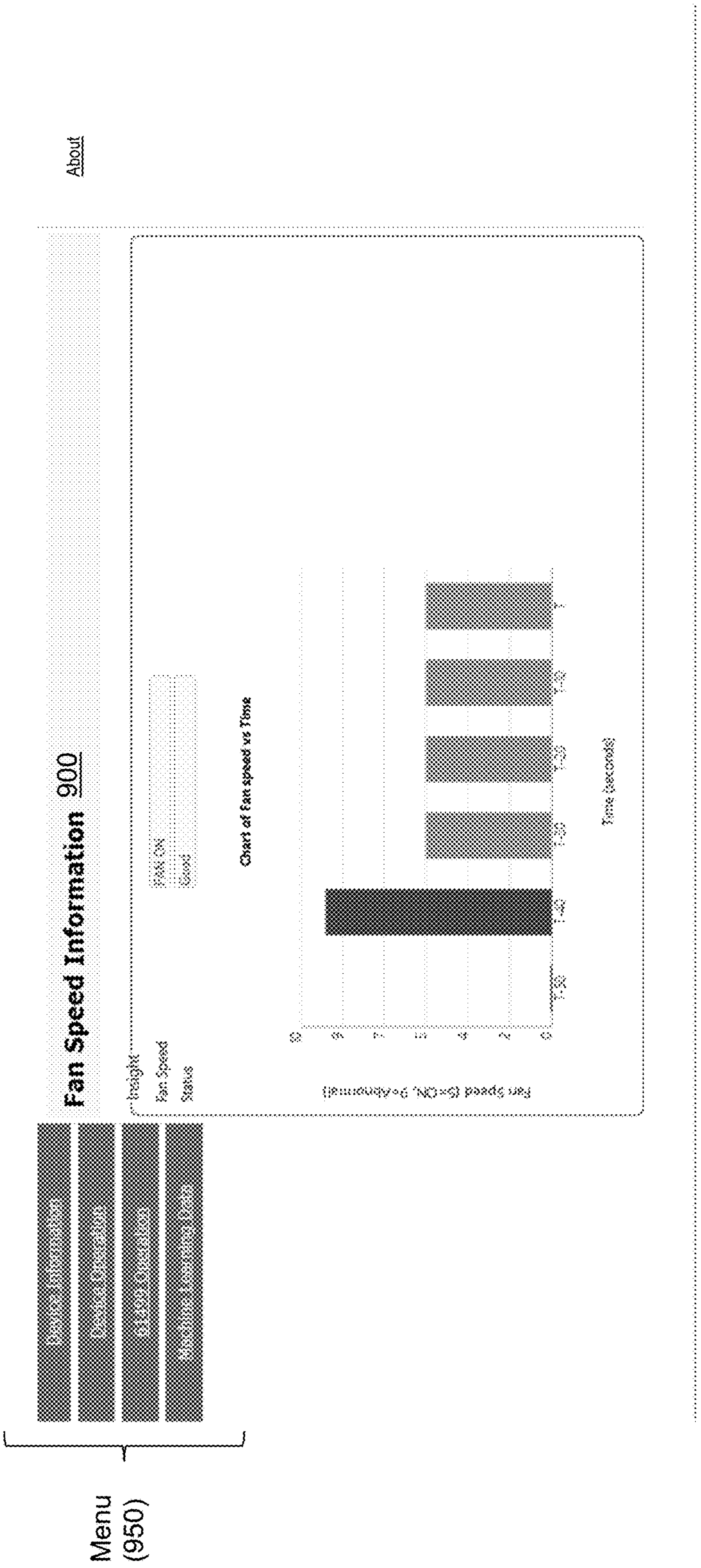
FIG. 9 illustrates an example web-based information of diagnostic information for a process or plant equipment being controlled which is monitored and/or controlled by the field device, in accordance with embodiments of the disclosure.

FIG. 9 illustrates an example web-based information of diagnostic information for a process or plant equipment which is monitored and/or controlled by a field device, in accordance with embodiments of the disclosure. The Web-based information can include operational and diagnostic information of information about equipment, such as Fan Speed Information 900, and a Menu 950 of selectable resources hosted on a Web Server.

The Fan Speed Information 900 includes various information, including diagnostic information, about the Fan and its operations. In this example, the Fan Speed Information 900 includes diagnostic information about the Fan, such as Fan Speed (e.g., Fan ON) and Status (e.g., Good. There is also provided a chart of Fan Speed versus Time, where Fan Speed of 5=ON, and 9=Abnormal. As shown in the chart, at time T-40, the Fan Speed is in the abnormal range. The Fan Speed is in the Normal range between times T-30 through T.

The Menu 950 includes a selection of available resources, including the Device Information, Device Operation, 61499 Operation, and Machine Learning Data, which are selectable by a user through a Web browser.

FIG. 10 illustrates an example Web page or Web user interface 1000 through which a user can define or change parameters and/or settings of a control operation/function to be performed by the embedded field device, in accordance with embodiments of the disclosure. As shown in FIG. 10, the Web page/interface 1000 includes various example operation parameters and settings for tuning a control process, such as for example IEC 61499 PID tuning, as well as diagnostic information about PID control.

The example diagnostic information of the PID control can include PV (Process Variable) measured value, Set Point Value and PID Output Value, Gain Set, Reset Set and Rate Set.

The example tunable operation parameters and settings can include PID Target Mode, Gain, Tune Request, Threshold, Rpeak, RslopeFL, PID Actual Mode, Error, Rdelay/Time, Rpeak Time, New Set Point, Bump, Rintercept and Rvalley. In this example, a user can select and provide user input for configuration of one or more of the tunable parameters and settings. After the user input, the user can select the Submit graphical button or element. In response to the Submit selection, the user input is communicated to the Web Server. The received user input is thereafter used to configure the PID control, e.g., set, change or modify the operation parameters and setting for the PID control in a database(s) stored in the memory of the field device. The operation parameters and/or settings for other functions, programs or modules also may be available for Web-based configuration.

It should be understood that FIGS. 6-10 are simply provided as examples of diagnostic information and other information, including Web-based configuration page or interface, which may be returned by the Web Server of a field device as part of its hosted resources to the Web Browser of the networked compute device or system at the request of the networked computer device or system. Other types of diagnostic information or graphical input/output elements, including a current value or setting for an operation parameter(s) and/or setting(s), may be returned by the Web Server of the field device according to the nature of the process/plant application, the type of field device or other factors related to the monitoring/control of an operation(s) of the industrial process or plant.

Other possible features and advantages associated with the disclosed invention will be appreciated by one of ordinary skill in the art.

It is understood that embodiments of the disclosure herein may be configured as a system, method, or combination thereof. Accordingly, embodiments of the present disclosure may be comprised of various means including hardware, software, firmware or any combination thereof.

It should also be understood that the example embodiments disclosed and taught herein are susceptible to numerous and various modifications and alternative forms. Thus, the use of a singular term, such as, but not limited to, "a" and the like, is not intended as limiting of the number of items. Furthermore, the naming conventions for the various components, functions, characteristics, thresholds, and other elements used herein are provided as examples, and can be given a different name or label. The use of the term "or" is not limited to exclusive "or", but can also mean "and/or".

It will be appreciated that the development of an actual, real commercial application incorporating aspects of the disclosed embodiments will require many implementation specific decisions to achieve the developer's ultimate goal for the commercial embodiment. Such implementation specific decisions may include, and likely are not limited to, compliance with system related, business related, government related and other constraints, which may vary by specific implementation, location and from time to time. While a developer's efforts might be complex and time consuming in an absolute sense, such efforts would nevertheless be a routine undertaking for those of skill in this art having the benefit of this disclosure.

Using the description provided herein, the example embodiments may be implemented as a machine, process, or article of manufacture by using standard programming and/or engineering techniques to produce programming software, firmware, hardware, or any combination thereof.

Any resulting program(s), having computer-readable program code, may be embodied on one or more tangible or non-transitory computer-usable media such as resident memory devices, smart cards or other removable memory devices, or transmitting devices, thereby making a computer program product or article of manufacture according to the embodiments. As such, the terms "article of manufacture" and "computer program product" as used herein are intended to encompass a computer program that exists permanently or temporarily on any computer-usable or storage medium or in any transmitting medium which transmits such a program.

A processor(s), controller(s) or processing unit(s) as described herein can be a processing system, which can include one or more processors, such as CPU, controller, ASIC, or other processing unit or circuitry, which controls or performs the operations of the devices or systems, described herein. Memory/storage devices can include, but are not limited to, disks, solid state drives, optical disks, removable memory devices such as smart cards, SIMS, semiconductor memories such as RAM, ROM, PROMS, etc. Transmitting mediums or networks can include, but are not limited to, transmission via wireline communication, wireless communication (e.g., Radio Frequency (RF) communication, Bluetooth®, Wi-Fi, Li-Fi, etc.), the Internet, intranets, telephone/modem-based network communication, hard-wired/cabled communication network, satellite communication, industrial communication networks, and other stationary or mobile network systems/communication links.

The flowchart and block diagrams in the Figures illustrate the architecture, functionality and/or operation of possible implementations of various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is to be appreciated that the concepts, systems, circuits and techniques sought to be protected herein are not limited to use in the example applications described herein (e.g., industrial applications), but rather may be useful in substantially any application where it is desired to receive decision support for each step in an automated fashion. While particular embodiments and applications of the present disclosure have been illustrated and described, it is to be understood that embodiments of the disclosure not limited to the precise construction and compositions disclosed herein and that various modifications, changes, and variations can be apparent from the foregoing descriptions without departing from the spirit and scope of the disclosure as defined in the appended claims.

Having described preferred embodiments, which serve to illustrate various concepts, structures and techniques that are the subject of this patent, it will now become apparent to those of ordinary skill in the art that other embodiments incorporating these concepts, structures and techniques may be used. Additionally, elements of different embodiments described herein may be combined to form other embodiments not specifically set forth above.

Accordingly, it is submitted that that scope of the patent should not be limited to the described embodiments but rather should be limited only by the spirit and scope of the following claims.

What is claimed is:

1. A method comprising:

conducting web-based communication between a networked computer device and a field device over an Ethernet-Advanced Physical Layer (APL) to allow a user of the networked computer device to access and interact with a web page or a web program that is hosted on a web server running on the field device;

configuring, through a direct connection for the web-based communication, at the field device at least a tunable operation parameter, including at least a proportional integral derivative (PID) control parameter, based on a user input, from the user, received across the Ethernet-APL by the field device from a user interaction with the web page or the web program through the networked computer device; and monitoring or controlling a process or plant, comprising sampling measurement data from a first instrument, performing computations based on the sampled measurement data and the at least tunable operation parameter, and sending a control signal to a second instrument based on the computations.

2. The method of claim 1, wherein the field device comprises an edge controller located in an intrinsically safe (IS) region of the process or plant, and web-based communication between the field device and the networked computer device is conducted over a direct network connection across the Ethernet-APL.

3. The method of claim 1, wherein the web page or program is accessible for the user interaction through a web browser running on the networked computer device.

4. The method of claim 3, further comprising:

sending from the web server the web page, a web user interface for the web program, or data for generating the web page or the web user interface on the web browser; and receiving at the web server the user input, provided by the user through the web page or the web user interface on the web browser, for configuring the at least tunable operation parameter.

5. The method of claim 4, the web page or the web user interface provides for user selection of the at least tunable operation parameter through the web browser.

6. The method of claim 4, wherein the web page or the web user interface provides web-based information associated with the field device on the web browser of the networked computer device, the web-based information comprising:

a current configuration of the at least tunable operation parameter; and a current operational status or state of the field device or of a program implemented by at least one of the field device for at least one of monitoring or controlling the process or plant, device information including at least one of a device identifier, type, health, or communication port information, diagnostic information for the field device, or diagnostic information of a process variable or equipment of the process or plant, which is monitored by the field device.

7. The method of claim 1, wherein the web server is configured to set or update the at least tunable operation parameter for monitoring or controlling the process or plant, the program being configured to run on the field device according to the at least tunable operation parameter.

8. The method of claim 7, wherein the program is tunable according to the at least tunable operation parameter.

9. The method of claim 8, wherein the program is compliant with IEC 61499, and comprises at least a PID control program or PID control block for controlling the process or plant.

10. The method of claim 1, wherein the web server configures the field device by inputting or updating the at least tunable operation parameter maintained in a database based on the user input, the database being stored in a memory on the field device.

11. The method of claim 1, wherein the field device includes an embedded framework platform through which to control operations of the field device including the operations of the web server and a control program to monitor or control the process or plant.

12. A field device comprising:

a network communication interface for conducting at least web-based communication with a networked computer device over an Ethernet-Advanced Physical Layer (APL);

a memory; and a processor configured to:

host a web page or program on a web server running on the field device, the web page or program being accessible to a user of the networked computer device, over the Ethernet-APL;

configure at least a tunable operation parameter, including at least a proportional integral derivative (PID) control parameter, based on a user input, from the user, received across the Ethernet-APL by the field device from a user interaction with the web page or program through the networked computer device; and monitor or control a process or plant by sampling measurement data from a first instrument, performing computations based on the sampled measurement data and the at least tunable operation parameter, and sending a control signal to a second instrument based on the computations.

13. The field device of claim 12, wherein the field device comprises an edge controller located in an intrinsically safe (IS) region of a process or plant, and web-based communication with the networked computer device is conducted over a direct network connection across the Ethernet-APL.

14. The field device of claim 12, wherein the web page or program is accessible for the user interaction through a web browser running on the networked computer device.

15. The field device of claim 14, wherein the processor is further configured to:

send from the web server the web page, a web user interface for the web program, or data for generating the web page or the web user interface on the web browser; and receive at the web server the user input, provided by the user through the web page or the web user interface on the web browser, for configuring the at least tunable operation parameter.

16. The field device of claim 15, wherein the web page or the web user interface provides for user selection of the at least tunable operation parameter through the web browser.

17. The field device of claim 15, wherein the web page or the web user interface provides web-based information associated with the field device on the web browser of the networked computer device, the web-based information comprising:

a current configuration of the at least tunable operation parameter; a current operational status or state of the field device or of a program implemented by the field device for monitoring or controlling the process or plant; device information including at least one of a device identifier, type, health, or communication port information; diagnostic information for the field device; diagnostic information of a process variable or equipment of the process or plant, which is monitored by the field device.

18. The field device of claim 12, wherein the web server is configured to set or update the at least tunable operation parameter for a program for monitoring or controlling the process or plant, the program being configured to run on the field device according to the at least tunable operation parameter.

19. The field device of claim 18, wherein the program is tunable according to the at least tunable operation parameter.

20. The field device of claim 19, wherein the program is compliant with IEC 61499, and comprises at least a PID control program or PID control block for controlling the process or plant.

21. The field device of claim 12, wherein the web server configures the field device by inputting or updating the at least tunable operation parameter maintained in a database based on the user input, the database being stored in the memory.

22. The field device of claim 12, wherein the processor is further configured to:

apply an embedded firmware framework to provide an embedded framework platform through which to control operations of the field device including the operations of the web server and a control program to monitor or control an operation of the process or plant.

23. A system comprising:

the field device of claim 12;

a networked computer device for configuring the field device for monitoring or controlling a process or plant; and an APL switch for enabling communication over an Ethernet network between the network computer device and the field device across Ethernet-APL.

24. A non-transitory tangible computer medium storing computer executable code, which when executed by a processor, is configured to implement a method of configuring a field device for monitoring or controlling an operation of a process or plant, the method comprising:

hosting a web page or program on a web server running on the field device, the web page or program being accessible to a user of the networked computer device, across Ethernet-Advanced Physical Layer (APL);

configuring at least a tunable operation parameter, including at least a proportional integral derivative (PID) control parameter, based on a user input, from the user, received across the Ethernet-APL, via a network interface, from a user interaction with the web page or program through the networked computer device; and monitoring or controlling a process or plant, comprising sampling measurement data from a first instrument, performing computations based on the sampled measurement data and the at least tunable operation parameter, and sending a control signal to a second instrument based on the computations.

* * * * *